US006895082B2

(12) United States Patent
Parker

(10) Patent No.: US 6,895,082 B2
(45) Date of Patent: May 17, 2005

(54) ALARM SYSTEM USING LOCAL DATA CHANNEL

(75) Inventor: James Parker, Thornhill (CA)

(73) Assignee: Digital Security Controls Ltd., Concord (CA)

( * ) Notice: Subject to any disclaimer, the term of this patent is extended or adjusted under 35 U.S.C. 154(b) by 606 days.

(21) Appl. No.: 09/887,045

(22) Filed: Jun. 25, 2001

(65) Prior Publication Data

US 2002/0029147 A1 Mar. 7, 2002

Related U.S. Application Data

(63) Continuation-in-part of application No. 09/495,353, filed on Feb. 1, 2000, now Pat. No. 6,252,504.

(30) Foreign Application Priority Data

Feb. 2, 1999 (CA) ............................................ 2260680

(51) Int. Cl.7 .............................................. H04M 11/00

(52) U.S. Cl. .......................................... 379/40; 379/37

(58) Field of Search ............................. 379/40, 37, 38, 379/39, 41–51, 33; 340/533, 536, 507

(56) References Cited

U.S. PATENT DOCUMENTS

| | | | | | |
|---|---|---|---|---|---|
| 4,903,292 | A | * | 2/1990 | Dillon | 379/50 |
| 5,579,378 | A | * | 11/1996 | Arlinghaus, Jr. | 379/106.02 |
| 5,901,201 | A | * | 5/1999 | Schull | 379/44 |
| 5,943,394 | A | * | 8/1999 | Ader et al. | 379/40 |
| 2002/0163997 | A1 | * | 11/2002 | Bergman et al. | 379/37 |

* cited by examiner

*Primary Examiner*—Stella Woo

(57) ABSTRACT

An alarm system has an alarm unit in combination with a line seize module. The alarm unit includes a transmitter/receiver, a control panel function, a key pad, an input/output port connected to a telephone line and an auto dialer for normally communicating with a remote monitoring station over the public switched telephone network. The line seize module includes an input communication port connected to the telephone line, a signal transmitter and receiver for communication over telephone wiring with the alarm unit, control logic, a line seize arrangement and an automatic dialer. Control logic processing signals are received by the input port. The line seize module, upon receiving an alarm signal from the alarm unit, reports the signal to a remote monitoring station using the automatic dialer and the public switched telephone network.

5 Claims, 2 Drawing Sheets

ALARM SYSTEM USING LOCAL DATA CHANNEL

CROSS-REFERENCE TO RELATED APPLICATIONS

This application is a continuation-in-part of Ser. No. 09/495,353 filed Feb. 1, 2000, now issued as U.S. Pat. No. 6,252,504.

FIELD OF THE INVENTION

The present invention relates to alarm control panels and in particular, to a simplified alarm control panel that uses a local data channel to communicate with a remote line seize module.

BACKGROUND OF THE INVENTION

Alarm security systems traditionally have an alarm control panel located in a secure area to reduce the possibility of defeating the system by destroying the control panel before an alarm condition can be reported. The control panel includes a line seize module as part thereof, or has a line seize module in immediate proximity to the alarm control panel. The control panel upon identifying an alarm condition uses the line seize module to seize the telephone line and dials the remote monitoring station. In this way, the processing circuitry for determining alarm conditions and communicating those alarm control conditions to a remote monitoring station over the telephone lines are located in a secure environment and cannot be immediately destroyed. With this arrangement the control panel communicates with a wireless key pad or a hardwired key pad typically located near an entryway. The control panel is also in communication with various sensors distributed throughout the premise.

Wireless alarm control systems have the distinct advantage of being easy to install, as it is not necessary to physically connect the individual sensors and the keypad with the control panel. Furthermore, after installation, if there is a problem with the location of a sensor, it can easily be moved to a new location and the sensor continues to communicate with the control panel. The components of wireless systems tend to be more expensive to manufacture but the installation of wireless systems is more cost effective, requires less skill, and is easily changed if necessary.

A cost effective security system has been proposed which includes an all in one system combination control panel located near the entryway to the premise. The combination control panel combines the control panel, keypad, line seize module, and sounder as a single unit. This combination control panel communicates with wireless sensors distributed throughout the house. This combination unit also includes an input/output port to connect the unit to the telephone system. The integration of all these components into a single unit makes the installation quite simple and substantially reduces the manufacturing costs. Unfortunately, it also greatly increases the risk that the alarm system can be compromised before an alarm signal is transmitted to the telephone company by physically destroying the unit.

The present invention provides many of the advantages of the combination control panel while rendering the system less vulnerable to defeat.

SUMMARY OF THE INVENTION

An alarm system according to the present invention comprises an alarm unit having a transmitter receiver, a control panel function, a keypad, and an input/output port for connection to a telephone line. The alarm unit is placed in close proximity to an entryway of the premise to be protected. The alarm unit cooperates with a separate and distinct line seize module which is placed in a secure location where it is connected to a telephone line. The line seize module includes its own input/output communication port connected to the local telephone line and as such, can communicate with the alarm unit over this existing network. Communication is at a low frequency below the audible range, and as such, can be simultaneous with use of the line for its conventional purpose as well as simultaneous digital transmission above the audible range. The line seize module also includes control logic, a line seize arrangement and an automatic dialer. The control logic is connected to the input/output port and signals are sent by the alarm unit to the line seize module and are received and processed by the control logic. When an alarm condition occurs, the control logic receives the signal from the alarm unit and then takes the appropriate steps to contact a remote monitoring station via the telephone system. This two part alarm system which communicates over the local data channel reduces the vulnerability of the system during a break in.

The line seize module can be placed in a relatively secure position and communication from the alarm unit to the line seize module occurs quickly and prior to destruction of the alarm unit.

In a preferred aspect of the invention, the line seize module includes logic for determining whether the alarm unit is active and should the alarm unit not send a heartbeat type signal to the line seize module, the line seize module can determine that an alarm condition exists and act on its own to contact the remote monitoring station and report the condition.

In yet a further aspect of the invention, the line seize module is solely battery powered.

The above arrangement has relatively low manufacturing costs as many of the components have been integrated into a single alarm unit, which cooperates with a separate, and distinct line seize module.

The local channel is the telephone wiring within the premise and the alarm unit and the line seize module share this channel with existing equipment however in the preferred embodiment the existing equipment are isolated during reporting of an alarm.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
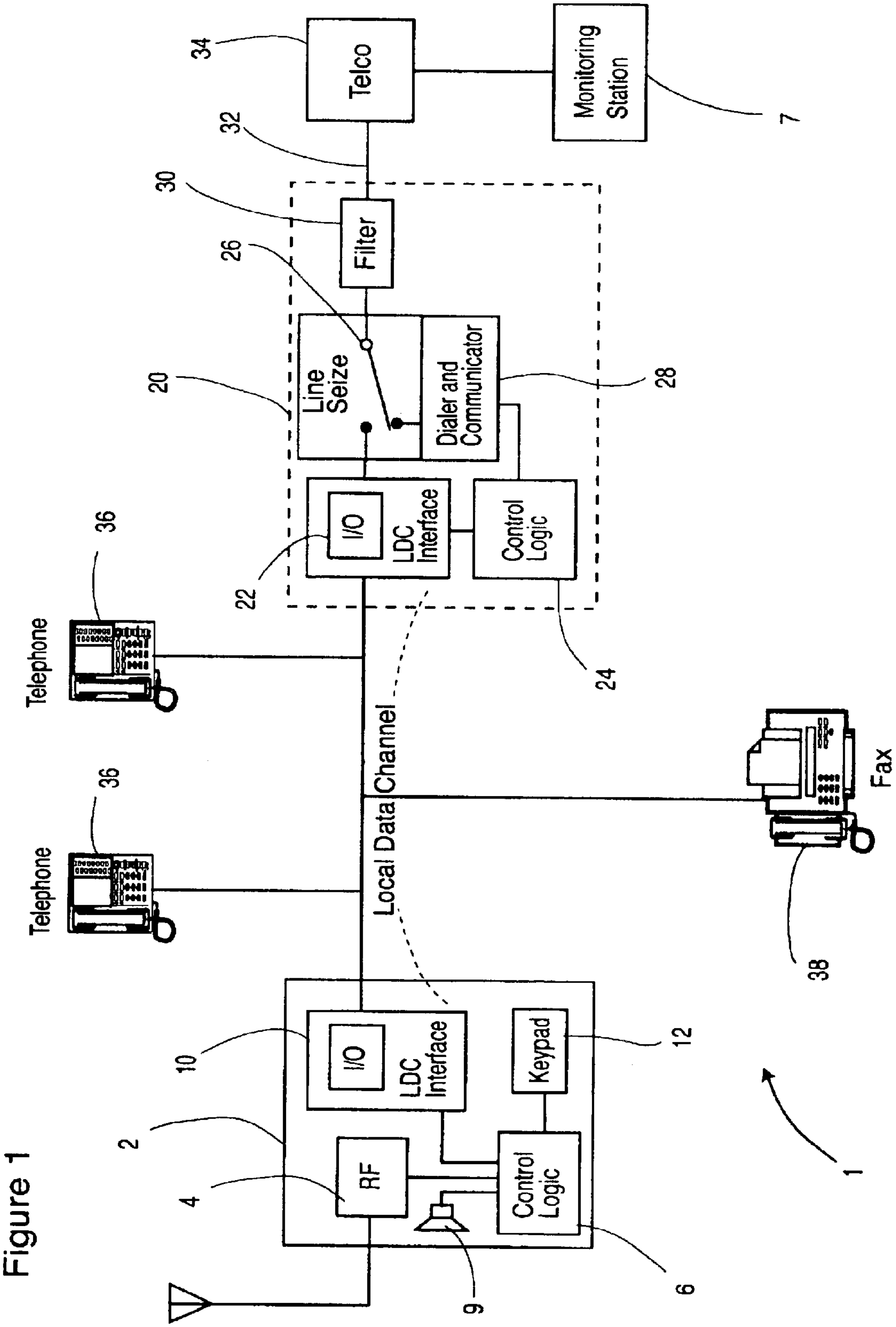
FIG. 1 is a schematic view of the alarm system.

The alarm system 1 includes three basic components, these being the alarm unit 2, the line seize module 20 and the local data channel 16, which are the existing telephone lines located within the household or premise being protected.

This system uses the publicly switched telephone network to contact a remote monitoring station 7. The portion 32 of the telephone line connects the premise to the public telephone system 34. The filter 30 and the line seize module 20 are located between the public telephone system and the local telephone lines. In this way, the various telephones and other telephone equipment that are on the local telephone line 16, are all located downstream of the filter 30 and the line seize module. Thus, the telephone 36 and the facsimile machine 38, as well as the alarm unit 2, are all downstream of the line seize module 20 and the filter 30.

The alarm unit 2 is similar to an all in one alarm system in that it includes an integrated transmitter receiver 4, control panel logic 6 for processing the signals from sensors, a key pad 12, a sounder 9, and an input/output communication port 10 for connection to the telephone line 16. The input/output port 10 includes a transmitting arrangement for transmitting a low frequency signal from the alarm unit to the line seize module 20. The frequency of this communication signal is preferably below the audible range and as such, it will not interfere with the normal operation of the telephone equipment 36, 38, which are on the local data channel 16. The preferred frequency is 190 hz as to avoid harmonics of the 60 hz power signal.

The line seize module 20 will typically be located in the basement of a house adjacent the point of entry of the telephone service to the household. The unit includes preferably an input/output communication port 22, which also includes a signal generating, and receiving capability for the low frequency communication signals with the alarm unit. Preferably there is two way communication between the alarm unit and the line seize module although one way communication from the alarm unit to the line seize module is sufficient. The control logic 24 of the line seize module 20 evaluates the signals received from the alarm unit and takes appropriate action with respect to the line seize relay 26 and the dialer and communicator 28. When an alarm is detected or recognized by the control logic 24, based on signals received from the alarm unit, the telephone line is seized by the line seize relay 26 and directly connects the dialer 28 to the telephone system. This is the position of the relay shown in FIG. 1. In such a position, the telephones 36 and the facsimile machine 38 have been isolated from the public telephone system and there is no voltage on the local data channel 16 between the line seize module and the alarm unit. If desired, such a voltage could be applied but that would not be the case with respect to the structure as shown in FIG. 1.

The alarm unit 2 continues to communicate with control logic 24 using the local channel 16. This communication to the line seize module does not rely on any voltage being present on this line. With the arrangement shown in FIG. 1, if the alarm unit 2 detects an alarm condition, such as the unauthorised opening of an entryway, it immediately communicates the alarm condition to the control logic 24 over the local data channel 16. This communication occurs quickly and is stored by the line seize module 20 for eventual communication to the remote monitoring station 7. The line seize module 20, upon receiving such a signal, seizes the telephone line, dials the remote monitoring station, and transmit thereto the alarm condition based on information received and provided by the control logic 24. If the alarm unit 2 is destroyed or disconnected from the local data channel 16, the alarm condition has already been transmitted to the line seize module and the alarm condition will be communicated to the remote monitoring station.

This arrangement provides a higher degree of safety relative to an all in one alarm device while still providing substantial reduction in manufacturing costs. The telephone line within the premise is a particularly desirable communication channel. Many homes are wired to have two pairs of telephone lines and often one pair of the telephone lines are not used. If this is the case, the alarm unit could use the additional pair of wires but it is not necessary as transmission at a frequency below the audible range allows normal telephone communication and alarm signal communication simultaneously. It also leaves the frequency above the audible range available for data transmission. The communication between the alarm unit and the line seize module do not interfere with normal use of the telephone system. Conventional telephone devices are designed to transmit and receive signals in the audible frequency range, which is normally between about 1000 and 3000 Hz and will not be affected by the low frequency signal.

The local data channel 16 allows the alarm unit 2, to communicate with the line seize module 20 located in a secure location remote from the alarm unit 2 and these units are easy to install. The low frequency communication between components of the alarm system does not interfere with the normal operation of the telephone services and the normal telephone services are cut off during the reporting of an alarm condition to the remote monitoring station. The alarm unit 2 can be located at any position on the local channel downstream of the line seize module.

The alarm unit 2 communicates with RF sensors which are distributed throughout the household or premise. Signals are transmitted and received between the alarm unit and the sensors via the transmitter receiver 4.

The installation time with respect to the above system is quite short and requires a relatively low skill level. The alarm unit 2 is located near an entryway and close to a connection point for the existing local telephone wiring 16. The line seize module is located in a secure location adjacent the entry point of the telephone line to the premise. The various sensors can be appropriately located throughout the premise. The alarm unit 2 and the line seize module 20 preferably communicate on an on going basis, and as such, the line seize module 20 can detect a condition where the alarm unit 2 is not reporting. This condition is reported as a separate alarm event to the remote monitoring station. With this arrangement, a secure alarm system is provided which is easy to install and also has reduced manufacturing costs as many of the components have been integrated into the alarm unit 2.

Figure 2:
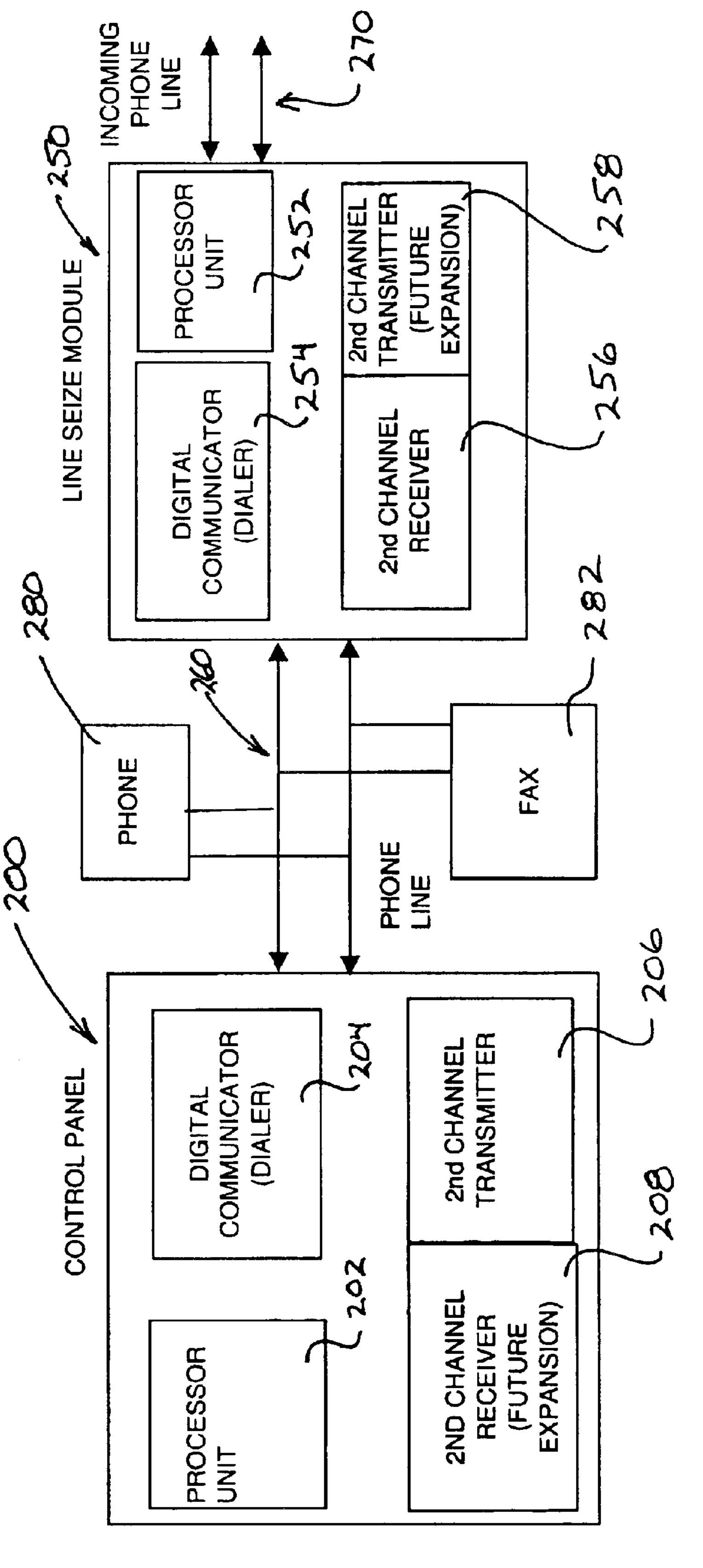
FIG. 2 is a schematic view of a modified system.

FIG. 2 is a modified system where the control panel 200 is in two way communication with the line seize module 250. Once again, the control panel and the line seize module are in communication using the on premise phone system 260 and the line seize module 250 is connected to the publicly switched telephone network 270.

The control panel 200 includes a processor 202 for processing the signals from the various sensors and a digital communicator 204 which includes an auto dialer for dialing out using the publicly switched telephone network. Thus, the control panel 200 can communicate directly with the remote monitoring station without the cooperation of the line seize module. The control panel also includes a second channel transmitter 206 which communicates with the line seize module 250 using a low frequency broadcast signal transmitted through the phone line 260. Preferably, the signal is transmitted at 190 hz. The control panel 200 can include a second channel receiver 208 which accommodates two way communication with the line seize module 250. This is the preferred structure, however, full two way communication is not necessary. One way communication from the control panel to the line seize module is sufficient and the control panel can look for changes with respect to the phone lines 260 to determine that the line seize module is communicating with the remote monitoring station. (Line seize module basically disconnects lines 260).

The line seize module 250 includes a processor 252 for processing the various signals received from the control panel and includes a digital communicator 254 with auto dialer for outdialing to the remote monitoring station. The second channel receiver 256 receives the broadcast signals provided on the telephone lines 260 and thus receives the one way communication from the control panel to the line seize module. In a preferred embodiment, the second channel transmitter 258 allows two way communication with the control panel.

The line seize module 250 also includes a switch for isolating the line seize module from the phone lines 260. The line seize module is placed between the publicly switched telephone network and the on premise network 260.

During operation of the system, the control panel 200 will communicate with the line seize module 250. For example, if the alarm system is armed and a door adjacent the control panel is opened, by a user returning to the premise, the control panel will communicate a potential compromised condition to the line seize module 250. This condition is transmitted using the second transmitter 206 over the phone line 260. The line seize module 250 upon receiving this transmission starts a timer associated with the processing unit 252. This timer has a fixed duration and if a further signal from the control panel indicating that the compromised condition has been removed is not received by the line seized module within the time duration, the line seize module will transmit an alarm signal to the remote monitoring station using the digital communicator 254. In the situation described above, each time a user enters the premise, there is a potential compromise condition and a signal is sent from the control panel to the line seized module. If the user subsequently timely enters the proper code at the keypad associated with the control panel, the control panel then sends a further signal to the line seize module indicating that the potential compromised condition has been removed. In this case, the line seize module will stop the timer and not communicate with the remote monitoring station. These two communications from the control panel to the line seize module are made using a low frequency signal on the phone lines 260.

The reason for this modified arrangement is to address the potential that the control panel will be compromised. For example, if this is a non-authorized entry, the control panel could be compromised by being physically destroyed or damaged and in this case, the second signal will not be sent to the line seize module. The timer for the line seize module will expire and an alarm signal will be forwarded to the remote monitoring station. As in the other system, the line seize module is preferably located in a secure location away from the control panel. Under these circumstances, the line seize module 250 communicates with the remote monitoring station when the control panel has been compromised or cannot communicate with the central station. If an alarm signal is detected and the control panel can outdial to the remote monitoring station using the on premise phone line 260 and the PSTN 270, the control panel acts on its own to communicate the alarm event. The line seize module is basically a back up arrangement used in the event that the control panel has been compromised or in the event the phone 280 or the fax 282 are using the phone line and as such, the control panel cannot phone out. In this case, the line seize module isolates the other equipment and communicates directly with the remote monitoring station. As can be appreciated, the control panel is still in communication with the line seize module, the control panel will see that the voltage on the phone lines 260 is removed, i.e. the phone lines was seized by the line seize module, and as such, the control panel effectively receives an acknowledgement signal that the line seize module has communicated with the remote monitoring station.

The remote monitoring station tracks various events for the security system. In this case, both the control panel and the line seize module can track various events and can reconcile the various events with the remote monitoring station when communication is achieved. For example, the line seize module could have a problem communicating with the remote monitoring station. The processor 252 includes a series of rules of determining how to proceed. For example, the line seize module may have a certain time period in which to initiate various attempts to contact the remote monitoring station and in the event that a certain number of attempts have occurred it will then stop this process. In this way the line seize module basically recognizes that communication cannot be achieved at this point in time and this communication will eventually be reported to the remote monitoring station.

It is preferred that the line seize module 250 be solely powered by a replaceable battery. In most cases the line seize module does not need to outdial the remote monitoring station as the control panel can report the alarm events without activating the line seize module. The control panel can in many cases monitor the phone line 260 and when the line phone is available, report to the remote monitoring station. The line seize module is used as a back-up for reporting potential compromised conditions and also for reporting alarm conditions, assuming the control panel is disabled or the phone lines are not available to the control panel.

Basically, the control panel communicates with the line seize module by sending a wake up signal on the phone line 260. The line seize module monitors the phone line 260, however, this is carried out in an energy efficient manner. The line seize module is battery powered and preferably is powered by two three volt lithium batteries. The batteries are connected in series and provide two voltage sources, namely a three volt source and a six volt source. The digital communicator dialer and the second channel transmitter and the eeprom will be powered by the six volt supply. The processing unit will control the power to these individual sections using transistor switches. These sections will remain powered down until they are needed. The sections powered by three volt source are the wake up source for sleep mode and have been designed for minimal current consumption to extend the life of the battery. The sleep mode includes the tamper input, the second channel receiver and the on board timer. In addition, the line seize module includes a monitoring arrangement, monitoring the battery voltages and communicates a low battery condition to the remote monitoring station if and when it occurs.

The line seize module normally operates in sleep mode. In sleep mode all sections powered by the six volt source have been powered down and the processor has entered a low current consumption sleep mode. The processor can be repowered by a tamper input signal, which indicates the line seize module is experiencing a tamper condition. It will also be powered up by the control panel trying to communicate with the line seize module. Furthermore, the processor can be powered up by a timer wake up signal, which is part of the line seize module and basically will occur on a set or regular basis.

The control panel 200 in one way communication with the line seize module 250 provides a cost effective arrangement where signals are sent from the control panel and received by the line seize module. The line seize module effectively acts as a back-up for the control panel in the event that the control panel cannot communicate with the remote monitoring station. The line seize module is preferably battery powered and can be placed at a suitable location adjacent to the entry point of the telephone system to the premise. In this way, the line seize module is located where needed and need not be placed near a suitable power outlet. The life of the line seize module, i.e. the power capabilities thereof, are extended in that it is only used in a back-up role. Although, the control panel and line seize module in a first embodiment have effectively one way communication, the control panel can monitor the telephone lines 260 to determine the line seize module has communicated to the remote monitoring station, when indeed this occurs. Furthermore, the line seize module can seize the line on a predetermined basis to provide a signal to the control panel indicating the operating status of the line seize module.

With the modified arrangement, the control panel can be placed in a potentially vulnerable location without compromising the reporting of alarm events. The line seize module is used in a back up role and has been specifically designed for battery operation. Preferably, the line seize module includes a number of features which reduce the power requirements thereof.

The embodiment of FIG. 2 has been specifically described with respect to the control panel communicating with the line seize module using a low frequency signal below the audible range. This is the preferred arrangement in that there can be communication above the audible range on the telephone lines 260 used to provide high speed data communication. This avoids any potential conflict initially or at subsequent dates. For example, it can be appreciated that high speed data communication services could be provided at a later date and this could seriously compromise an alarm system which used the high frequency range. If the system is such that high data communication is not available or will not be used, the control panel can communicate with the line seize module in the high frequency range above the audible range. This avoids interference with the normal use of the phone system in the audible range.

The embodiment of FIG. 2 has also shown the optional second channel receiver for the control panel and the second channel transmitter for the line seize module. This arrangement adds some cost with respect to the system, but it provides more efficient communication between the control panel and the line seize module. Some applications can justify this additional cost.

The line seize module 252 can be designed to monitor for a heartbeat type signal from the control panel. This provides a security check carried out by the line seize module and in the event that heartbeat signal is not received within a certain time period, the line seize module can report this condition to the monitoring station.

In some circumstances, the line seize module 250 may not be able to complete a communication with the remote monitoring station. Under these circumstances, the line seize module can seize the telephone line for an extended period of time which is effectively monitored by the control panel 200. Upon recognition of this extended period of time, the control panel will generate a trouble condition to alert a user of the fail to communicate to the monitoring station. Upon expiry of this extended period of time, the line seize module returns to normal operation.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. An alarm system comprising an alarm unit in combination with a line seize module; said alarm unit including a transmitter/receiver, a control panel function, a key pad, an input/output port connected to a telephone line and an auto dialer for normally communicating with a remote monitoring station over the public switched telephone network; said line seize module including an input communication port connected to said telephone line, a signal transmitter and receiver for communication over telephone wiring with said alarm unit, control logic, a line seize arrangement and an automatic dialer; said control logic processing signals received by the input port; said line seize module upon receiving an alarm signal from said alarm unit reporting the signal to a remote monitoring station using the automatic dialer and the public switched telephone network.

2. An alarm system as claimed in claim 1 wherein said alarm unit and said line seize module communicate using a signal of a frequency outside of the audible range.

3. An alarm system as claimed in claim 2 wherein said frequency is below the audible range.

4. An alarm system as claimed in claim 2 wherein said line seize module includes a timing arrangement for setting a time period upon receipt of a first signal from said alarm unit for receiving a second signal from said alarm unit and upon failure to receive said second signal within the time period initiating contact over the public switched telephone network with said remote monitoring station and reporting an alarm event.

5. An alarm system as claimed in claim 4 wherein said alarm unit is located adjacent an entryway to a premise being protected and said line seize module is located in said premise in a position of higher security relative to the position of said alarm unit.

* * * * *